May 26, 1931.   H. SEE   1,806,920
CORRUGATED CONDUIT
Filed Dec. 27, 1927
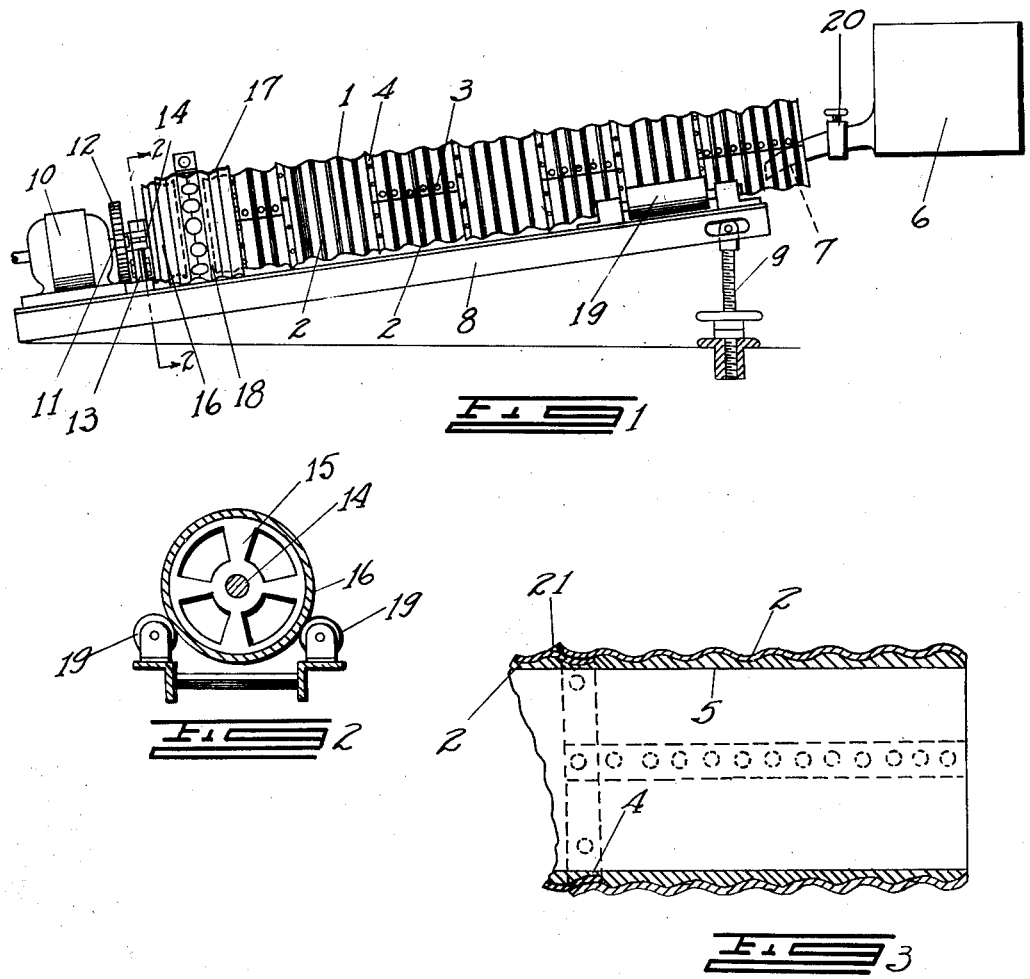

Patented May 26, 1931

1,806,920

UNITED STATES PATENT OFFICE

HOWARD SEE, OF ATLANTA, GEORGIA, ASSIGNOR TO THE DIXIE CULVERT & METAL COMPANY, OF ATLANTA, GEORGIA, A CORPORATION OF GEORGIA

CORRUGATED CONDUIT

Application filed December 27, 1927. Serial No. 242,945.

My invention relates to the formation of tubes, pipes or culverts, which I will refer to generally as conduits formed of corrugated sheet metal, and coated with a filling for the entire internal area, sufficient, at least, to make a smooth pipe internally. It relates more specifically to a centrifugally lined corrugated sheet metal conduit.

In the construction of a corrugated sheet metal conduit, metal sheets which are previously corrugated are formed into cylinders, with the meeting edges lapped and riveted, forming a lateral seam, and the sections made up from the individual sheets are joined together, usually by leaving the terminal of the lateral seam open, and expanding one end of each section to lap the end of another section, whereupon rivets are used to unite the two sections, thus forming a circumferential seam. The corrugations in the resulting conduit are circumferential thereof, and the seams are both lateral or lengthwise, for each section, and circumferential between each section. The conduits so formed are usually built in such lengths as will be easy to ship, and a series of them are set together in the field or on the job to provide for the desired length of conduit structure. Various types of joints are provided for the conduit pieces, which do not particularly concern this invention.

It is the object of this invention to provide a coating process and a conduit of the type noted, which is so coated that all corrugations are filled, leaving a smooth interior to the conduit, and in which all seams are fully covered, thus permitting use of the conduits for purposes where considerable pressure is required.

It is thus the object of my invention to provide a conduit structure having the advantage of great strength under load and inexpensiveness of manufacture, inherent in the corrugated sheet metal pipe, together with the smooth interior and resistance to internal pressure of the cast iron pipe. Also, the coating material may be such as will protect the interior of the conduit against corrosive and erosive influences.

The new conduits may be employed as culverts, and also for sewage lines, high pressure water lines, siphons, pen stock, and other purposes where a leak-proof, corrosion-proof, and pressure-proof element is required.

I accomplish my objects by that construction of conduit, made by that coating and filling process, of which typical and illustrative instances will be hereinafter specifically pointed out and claimed.

In the drawings:—

Figure 1 is a side elevation illustrating a mechanism for coating and filling a corrugated pipe according to my invention.

Figure 2 is a section taken on the line 2—2 of Figure 1.

Figure 3 is a longitudinal section taken through a conduit formed according to my invention.

Referring first to the corrugated conduit element, I have indicated at 1 a conduit formed of sections 2. Each section is formed of a lengthwise corrugated sheet bent into a cylinder and riveted in a lateral seam 3. The sections each formed of one sheet are lapped in a circumferential manner, and riveted to form a conduit of the length desired, the seams of circumferential nature being indicated at 4. As shown in Figure 3, I fill the interior of the corrugated conduit so formed with a suitable bituminous or similar composition, so that the corrugations in the conduit are filled up, leaving a smooth cylindrical interior. The filling is shown at 5, and it will be noted that it not only smooths the interior of the conduit, but also completely closes all the seams therein.

The problem of providing an interior coating of a corrugated sheet metal conduit, which will be smooth and adherent, and will not crack or break or deteriorate under chemical action, or the influences of the weather, is not simple. Ordinarily centrifugal casting of a lining in a corrugated conduit would result in a corrugated lining, and it is desired to have the lining smooth. Molding of a lining and setting it in place would not fill the seams and cover them also, and would entail considerable expense. Also, products which could be readily molded and handled as inserts into the conduit will not possess the rubbery characteristics which are desirable for a conduit lining which will resist erosive action and remain sufficiently flexible to remain in place when the conduit is deformed, as in a fill of earth.

By my invention I provide for a combination of centrifugal molding and gravity flow in a corrugated conduit, which exactly serves my purpose.

As a typical, simple mechanism for providing the said conduit filling and coating, I provide a kettle 6, in which is maintained a heat liquefied bitumen, which bitumen flows from the tank through a suitable spout 7. A platform or base 8 rests on a jack 9 at the spout end of the apparatus so that the slant of the base can be adjusted. A motor 10 may be used for power, which motor has a pinion 11 thereon that drives a gear 12 having a shaft 14 arranged on a standard 13, central of the frame. The shaft has a spider 15 thereon, to the peripheral portions of which is secured a corrugated cylinder 16, corresponding to the shape of the conduit to be coated. There will be a corrugated band 17 of a size to fit the conduit 1 and the cylinder or drum 16.

As indicated, the band is set over the end of the conduit to be filled and the drum, and clamped in place. A series of holes in the band will normally be provided as indicated at 18.

The conduit 1, resting on a stand formed of rollers 19 mounted on the base, is engaged and held to the drum so as to revolve when the motor is driven.

With the conduit at a slant, and in rotary motion, the liquid bitumen is permitted to flow out of the spout into the upper end of the conduit, using a valve to control the flow as at 20. It will solidify fairly quickly because the conduit is not heated and is kept in motion, and as soon as the first corrugation fills up the bitumen will flow onto the next corrugation and fill it, and so on, until the bitumen has filled all of the corrugations and starts to come out through the holes in the clamping band.

The spout or the kettle is withdrawn slightly so as to permit the filling of the corrugations at the upper end of the conduit, which, for convenience, are not filled at the outset of the process.

The bitumen is then stopped and the conduit revolved until there is sufficient solidity, due to cooling, so that the coating will remain in place.

If additional thickness is desired for the filling, it can be added, using proper slant and speed to give an even coating.

The speed of revolution will be controlled to give the proper coating effect without any difficulty, and the type of drive, the mechanism used to support and revolve the conduit, can be varied at will. The essential is that the operator should be able to control the speed of revolution and the pitch or slant at which the conduit is held during the filling process, and the rate of flow of the filling material.

To hasten the cooling and solidification of the filling, water can be flown into the filled conduit, and will form a film within it, due to the centrifugal action. Also, the conduit may be lowered to a horizontal position during the cooling.

As a coating material I prefer a rubbery bitumen having considerable adhesiveness such as is found in blown oils. Other bitumens than blown oils can be used, however.

The centrifugal action will cause the bitumen to flow out through any cracks and thus fill the seams, as indicated at 21, and naturally the solidified coating will entirely seal the interior of the conduit.

Bituminous materials of paint like quality so far as adhesiveness is concerned, are desirable, this being the case in the instance of the blown oils heretofore referred to.

Finely divided mineral matter in insufficient quantities to materially affect the flow of the filling material during the process described may be employed to give a harder quality to the filling without destroying its adhesiveness.

The usefulness of the product of my invention for the purposes noted at the outset of this specification will be evident without further remark.

Having thus described my invention, what I claim as new and desire to secure by Letters Patent, is:—

1. A process for providing a smooth interior for corrugated sheet metal conduits, which consists in rotating the conduit while holding the same at a slant, and at the same time pouring heat liquefied bituminous material into the upper end of said conduit, whereby gravity and centrifugal force act simultaneously to provide a smooth interior coating that fills the corrugations.

2. A process for providing a smooth interior for corrugated sheet metal conduits, which consists in rotating the conduit while holding the same at a slant, and at the same time pouring heat liquefied bituminous material into the upper end of said conduit, whereby gravity and centrifugal force act simultaneously to provide a smooth interior coating that fills the corrugations, and rotating the conduit after the filling is complete, until cooling action has solidified the filling.

3. A process for providing a smooth interior for corrugated sheet metal conduits, which consists in rotating the conduit while holding the same at a slant, and at the same time pouring heat liquefied bituminous material into the upper end of said conduit, whereby gravity and centrifugal force act simultaneously to provide a smooth interior coating that fills the corrugations, and rotating the conduit after the filling is complete, until cooling action has solidified the filling, water being flowed into the conduit during the final rotation thereof to aid the cooling.

HOWARD SEE.